US008752159B2

(12) United States Patent
Eun et al.

(10) Patent No.: US 8,752,159 B2
(45) Date of Patent: Jun. 10, 2014

(54) INFORMATION PROCESSING APPARATUS, VERIFICATION SYSTEM, CONTROL METHOD OF VERIFICATION SYSTEM, PROGRAM OF CONTROL METHOD OF VERIFICATION SYSTEM, AND STORAGE MEDIUM

(75) Inventors: Jongsook Eun, Tokyo (JP); Takahiko Uno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 13/179,724

(22) Filed: Jul. 11, 2011

(65) Prior Publication Data
US 2012/0011580 A1 Jan. 12, 2012

(30) Foreign Application Priority Data
Jul. 12, 2010 (JP) ................................ 2010-157937

(51) Int. Cl.
G06F 17/30 (2006.01)
G06F 7/04 (2006.01)
G06F 15/16 (2006.01)
H04L 29/06 (2006.01)

(52) U.S. Cl.
USPC ........... 726/10; 726/2; 726/6; 726/7; 713/150

(58) Field of Classification Search
USPC ........................................................ 726/10
See application file for complete search history.

(56) References Cited

U.S. PATENT DOCUMENTS

| 7,296,298 | B2* | 11/2007 | Salgado | 726/30 |
| 2008/0252940 | A1* | 10/2008 | Koizumi | 358/474 |
| 2010/0024025 | A1* | 1/2010 | Yoshida et al. | 726/9 |
| 2010/0228970 | A1* | 9/2010 | Oka et al. | 713/156 |
| 2010/0238500 | A1* | 9/2010 | Teramoto et al. | 358/1.15 |
| 2010/0313066 | A1* | 12/2010 | Hanes | 714/6 |

FOREIGN PATENT DOCUMENTS

| CN | 101521715 A | 9/2009 |
| CN | 101621522 A | 1/2010 |
| JP | 2000-224161 | 8/2000 |
| JP | 2001-52131 | 2/2001 |

(Continued)

OTHER PUBLICATIONS

Chinese Office Action issued Jul. 3, 2013, in China Patent Application No. 201110199533.3.

*Primary Examiner* — Andrew Nalven
*Assistant Examiner* — Khang Do
(74) *Attorney, Agent, or Firm* — Oblon, Spivak, McClelland, Maier & Neustadt, L.L.P.

(57) ABSTRACT

An information processing apparatus employing user access authorization management verifies user access authorization using a portable storage medium storing identification (ID) information for the portable storage medium and user verification information registered in the information processing apparatus while including the portable storage medium ID as verified ID information for the portable storage medium. The information processing apparatus includes a processor to conduct generating ticket information including read portable storage medium ID; transmitting the generated ticket information to a designated issuee; receiving a request to update the ID information for the portable storage medium; obtaining the generated ticket information and the ID information for a new portable storage medium; verifying authenticity of the obtained ticket information; and updating the portable storage medium ID, included in the user verification information registered, with the ID information for the new portable storage medium when the authenticity of the obtained ticket information is verified.

17 Claims, 9 Drawing Sheets

(56) References Cited

FOREIGN PATENT DOCUMENTS

| | | |
|---|---|---|
| JP | 2002-140665 | 5/2002 |
| JP | 2002-304602 | 10/2002 |
| JP | 2003-317037 | 11/2003 |
| JP | 3636984 | 1/2005 |
| JP | 3693587 | 7/2005 |
| JP | 2005-258878 | 9/2005 |
| JP | 3808297 | 5/2006 |
| JP | 2006-252177 | 9/2006 |
| JP | 3913363 | 2/2007 |
| JP | 3983097 | 7/2007 |
| JP | 2008-299391 | 12/2008 |
| JP | 4273947 | 3/2009 |

* cited by examiner

INFORMATION PROCESSING APPARATUS, VERIFICATION SYSTEM, CONTROL METHOD OF VERIFICATION SYSTEM, PROGRAM OF CONTROL METHOD OF VERIFICATION SYSTEM, AND STORAGE MEDIUM

CROSS-REFERENCE TO RELATED APPLICATIONS

This application claims priority to Japanese Patent Application No. 2010-157937, filed on Jul. 12, 2010 in the Japan Patent Office, which is incorporated by reference herein in its entirety.

BACKGROUND OF THE INVENTION

1. Field of the Invention

The present invention relates to an information processing apparatus, a verification system, and a method and program for managing the information processing apparatus, and more particularly to management of a storage medium useable for verifying an access authorization for the information processing apparatus.

2. Description of the Background Art

With the advancement of digitization of information, image processing apparatuses such as printers or facsimiles for outputting digitized information and scanners for digitizing document information become indispensible apparatuses. Such image processing apparatuses have image capturing capabilities, image forming capabilities, and communication capabilities, enabling image processing apparatuses to function as printers, facsimiles, scanners, copiers, or multi-functional apparatuses combining several of these capabilities, known as multi-functional peripherals (MFP).

As for such image processing apparatuses, in terms of information security, the necessary access authorization verification is generally conducted using integrated circuit (IC) cards. An IC card usable for such verification may be also used to manage other matters, such as access to offices or buildings.

In the event that a user has lost or damaged such IC card it must be re-issued. If the same IC card is used for both access authorization processing of image processing apparatuses and the entry/exit purpose, and if an administrator of issuing IC cards, and an administrator of managing the access authorization of image processing apparatuses are different persons, then the re-issued IC card cannot be used for image processing apparatuses until a new access authorization of image processing apparatus is set to the re-issued IC card.

In view of such drawback, information for applications installed for each of issued IC cards may be registered, and when the card is re-issued, applications that need to be installed in a re-issued card can be determined based on the registered application information, as disclosed, for example, in JP-2003-324421-A.

Alternatively, when an IC card is issued and distributed, a spare card is distributed with the IC card, in which, when the IC card is lost, a user can re-issue a card using the spare card, and applications can be installed using a user terminal such as a personal computer, as disclosed, for example, in JP-2005-258878-A.

Further, in another method, a service provider and a card issuer exchange information with each other when one IC card is re-issued. For example, the card issuer reports information matching an old card ID and a re-issued card ID to the service provider, or the service provider transmits information read from the re-issued card to the card issuer to obtain the verification of re-issued card, and then the re-installment of applications is determined, as disclosed, for example, in JP-2002-150233-A.

Such IC cards, which are carried by each of users and used as IC cards for the entry/exit administration, can store information for applications such as access authorization of apparatuses to enhance user convenience. However, once the card is lost or damaged, such convenience cannot be utilized. Further, when one card is to be re-issued, the card issuer and the administrator of access authorization of apparatuses may need to communicate with each other, in which the workload of the administrators of IC card increases.

In case of using the method of JP-2003-324421-A, the card issuing administrator needs to manage or administer information for applications installed on the issued IC card such as access authorization of apparatuses. However, if the card issuing administrator that can issue cards belongs to an external organization or entity with respect to card users, such information management or administration may be difficult or impossible to devise.

Further, in case of using the method of JP-2005-258878-A, because the spare cards are distributed to users, a security concern such as forged cards may arise. Further, if information writing to the cards by users is restricted for security reasons, the method of JP-2005-258878-A may not be convenient for users.

Further, in case of using the method of JP-2002-150233-A, the card issuing administrator and the service provider need to exchange information, thereby increasing the workload on the both administrators of the IC card. Further, the method of JP-2002-150233-A needs a system for automatic processing, which increases the installation cost of the system.

SUMMARY

In one aspect of the invention, an information processing apparatus employing user access authorization management is devised. The information processing apparatus employing user access authorization management verifies user access authorization using a portable storage medium storing identification (ID) information for the portable storage medium and user verification information registered in the information processing apparatus while including the portable storage medium ID as verified ID information for the portable storage medium. The information processing apparatus includes a processor configured to conduct the steps of: reading the portable storage medium ID from the portable storage medium; generating ticket information by including the portable storage medium ID read at the reading step and use condition information for the portable storage medium, the ticket information being prepared when updating the verified ID information for the portable storage medium registered in the information processing apparatus; designating an issuee to be transmitted with the generated ticket information from the information processing apparatus; transmitting the generated ticket information to the designated issuee; receiving a request to update the verified ID information for the portable storage medium registered in the information processing apparatus; obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus; verifying authenticity of the ticket information obtained at the obtaining step by comparing contents included in the obtained ticket information and contents included in the user verification information registered in the information processing apparatus; retrieving the portable storage medium ID, matched to the portable storage medium ID included in the obtained ticket information, from the user verification information registered in the information processing apparatus when the authenticity of the obtained ticket information is verified at the verification step; and updating the portable storage medium ID, included in the user verification information registered in the information processing apparatus, with the ID information for the new portable storage medium.

In another aspect of the invention, a method of managing user access authorization for an information processing apparatus is devised. In the method of managing user access authorization for an information processing apparatus, the user access authorization of the information processing apparatus is verifiable using a portable storage medium storing identification (ID) information for the portable storage medium and user verification information registered in the information processing apparatus while including the portable storage medium ID as verified ID information for the portable storage medium. The method includes the steps of; reading the portable storage medium ID from the portable storage medium; generating ticket information by including the portable storage medium ID read at the reading step and use condition information for the portable storage medium, the ticket information being prepared when updating the verified ID information for the portable storage medium registered in the information processing apparatus; designating an issuee to be transmitted with the generated ticket information from the information processing apparatus; transmitting the generated ticket information to the designated issuee; receiving a request to update the verified ID information for the portable storage medium registered in the information processing apparatus; obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus; verifying authenticity of the ticket information obtained at the obtaining step by comparing contents included in the obtained ticket information and contents included in the user verification information registered in the information processing apparatus; retrieving the portable storage medium ID, matched to the portable storage medium ID included in the obtained ticket information, from the user verification information registered in the information processing apparatus when the authenticity of the obtained ticket information is verified at the verification step; and updating the portable storage medium ID, included in the user verification information registered in the information processing apparatus, with the ID information for the new portable storage medium.

In another aspect of the invention, a computer-readable medium storing a program including instructions that when executed by a computer cause the computer to execute a method of managing user access authorization for an information processing apparatus is devised. In the method of managing user access authorization for an information processing apparatus, the user access authorization of the information processing apparatus is verifiable using a portable storage medium storing identification (ID) information for the portable storage medium and user verification information registered in the information processing apparatus while including the portable storage medium ID as verified ID information for the portable storage medium. The method includes the steps of; reading the portable storage medium ID from the portable storage medium; generating ticket information by including the portable storage medium ID read at the reading step and use condition information for the portable storage medium, the ticket information being prepared when updating the verified ID information for the portable storage medium registered in the information processing apparatus; designating an issuee to be transmitted with the generated ticket information from the information processing apparatus; transmitting the generated ticket information to the designated issuee; receiving a request to update the verified ID information for the portable storage medium registered in the information processing apparatus; obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus; verifying authenticity of the ticket information obtained at the obtaining step by comparing contents included in the obtained ticket information and contents included in the user verification information registered in the information processing apparatus; retrieving the portable storage medium ID, matched to the portable storage medium ID included in the obtained ticket information, from the user verification information registered in the information processing apparatus when the authenticity of the obtained ticket information is verified at the verification step; and updating the portable storage medium ID, included in the user verification information registered in the information processing apparatus, with the ID information for the new portable storage medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
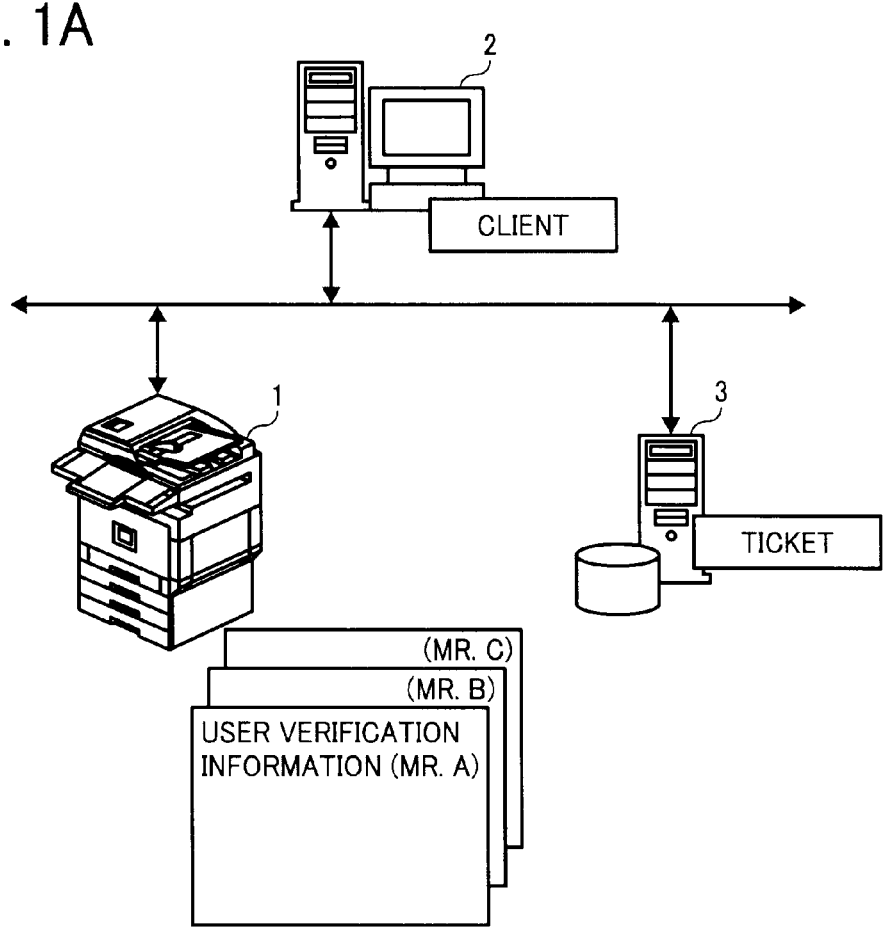
FIG. 1A shows an operating environment of a verification system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner.

Referring now to the drawings, a verification system according to example embodiment is described hereinafter.

Hereinafter, an access authorization verification system for an apparatus according to an example embodiment is discussed as a system to verify access authorization for an image processing apparatus. It should be noted that the image forming apparatus is but one example of an information processing apparatus, and the present invention is applicable to various verification systems using various other types of information processing apparatuses.

FIG. 1A shows an operating environment of the verification system according to an example embodiment. As shown in FIG. 1A, the verification system uses, for example, an image forming apparatus 1, a client terminal 2, and a server 3, connectable to each other via a network. In the verification system, when an integrated circuit (IC) card carried by a user is read by the image forming apparatus 1, access authorization of image forming apparatus 1 for such user can be verified.

The IC card carried by the user may be issued as a card for managing the entry/exit administration to office buildings and/or security zones in the office buildings. Such IC card is disposed with a storage, to which the verification information for access authorization for the image forming apparatus 1 can be stored, wherein the verification information is used to verify the access authorization of users to the image forming apparatus 1. In an example embodiment, an IC card issuer and a service provider providing a verification system for the image forming apparatus 1 are typically different entities or persons, in which the verification system for the image forming apparatus is provided by the service provider by utilizing the IC card issued by the IC card issuer. The IC card is just one example of a portable storage medium, and another portable storage medium having a storage or memory and communicable with an external device can be similarly used. Such portable storage medium may be used as an information storage, which may be referred to as a memory, and more particularly to as a rewritable non-volatile memory that can rewrite data, and retain or store data even when a power supply to the memory is turned OFF, and such memory is, for example, an electrically erasable programmable read-only memory (EEPROM) or the like, but not limited thereto.

The image forming apparatus 1, which may include at least one of the image capturing function, the image forming function, and the communication function, can be devised as a printer, a facsimile machine, a scanner, a copier, or a multi-functional apparatus having a given combinations thereof, which may be known as multi-functional peripherals (MFP).

Further, the image forming apparatus 1 having the above mentioned verification function using the IC card may have another function. Specifically, the image forming apparatus 1 may have a function of processing information for card-switch ticket (hereinafter, ticket processing function) when an IC card is re-issued due to the lost or damages of IC card, wherein the card-switch ticket is used to set the access authorization of the image forming apparatus 1 for the re-issued IC card. Such ticket processing function is to be described in detail later. The information for card-switch ticket may be referred to as card-switch ticket information, or ticket information.

The client terminal 2 may be an information processing terminal operable by a user, which may be an information processing apparatus such as a personal computer (PC) or the like. The server 3 may be a data server usable as a storage, which stores information for card-switch ticket generated by the ticket processing function, in which the server 3 may be used as a ticket server.

Figure 2:
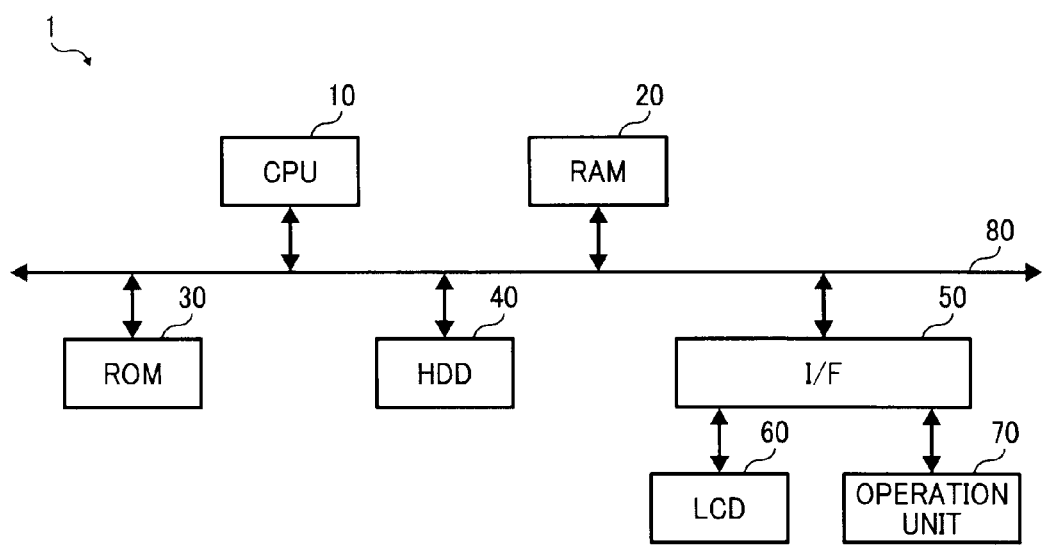
FIG. 2 is a block diagram of a hardware configuration of an information processing apparatus used in the verification system of FIG. 1A.

A description is now given of an example hardware configuration of the image processing apparatus 1, the client terminal 2, and the server 3 with reference to FIG. 2, which shows a block diagram of an example hardware configuration of the image processing apparatus 1. Further, the image processing apparatus 1 may include engines to implement a scanner, a printer, or the like in addition to a hardware configuration shown in FIG. 2. In the following explanation, a hardware configuration explained for the image processing apparatus 1 of FIG. 2 can be similarly applied to the client terminal 2 and the server 3, if not the same or identical.

As shown in FIG. 2, the image processing apparatus 1 may be configured as similar to a general server or personal computer (PC). Specifically, the image processing apparatus 1 may include a central processing unit (CPU) 10, a random access memory (RAM) 20, a read only memory (ROM) 30, a hard disk drive (HDD) 40, and an interface (I/F) 50, which may be connectable each other via a bus 80. Further, the I/F 50 is connectable to a liquid crystal display (LCD) 60 and an operation unit 70. Further, an engine for implementing a scanner, a printer, or the like can be connected to the bus 80.

The CPU 10 is a computing processor, which controls the image processing apparatus 1 as a whole. The CPU 10 can be configured with various types of processor, circuit, or the like such as a programmed processor, a circuit, an application specific integrated circuit (ASIC), used singly or in combination. The RAM 20 is a volatile memory, to which data or information can be written and read with a high speed, and is used as a working memory when the CPU 10 processes data or information. The ROM 30 is a non-volatile memory used as read only memory, and stores programs such as firmware or the like. The HDD 40 is a non-volatile storage, to which data or information can be written and read, and stores operating system (OS), management or control programs, application programs, various data or the like.

The I/F 50 can be used to connect various types of hardware and network to the bus 80, and controls such connection. The LCD 60 is a user interface to display information visually, by which the status of the image processing apparatus 1 can be checked by a user. The operation unit 70 is a user interface such as a keyboard, a mouse, by which information can be input to the image processing apparatus 1 by the user. Further, as above explained with reference to FIG. 1A, because the server 3 is used as a server, the user interface such as LCD 60 and operation unit 70 may be omitted for the server 3.

In such hardware configuration, programs stored in a storage unit such as ROM 30, HDD 40, or optical disk can be read and then loaded to the RAM 20, and the CPU 10 runs such programs to control various units, by which a software-executing controller can be configured. With a combination of such software-executing controller and hardware, a functional block to operate the image processing apparatus 1, the client terminal 2, and the server 3 can be configured.

Figure 3:
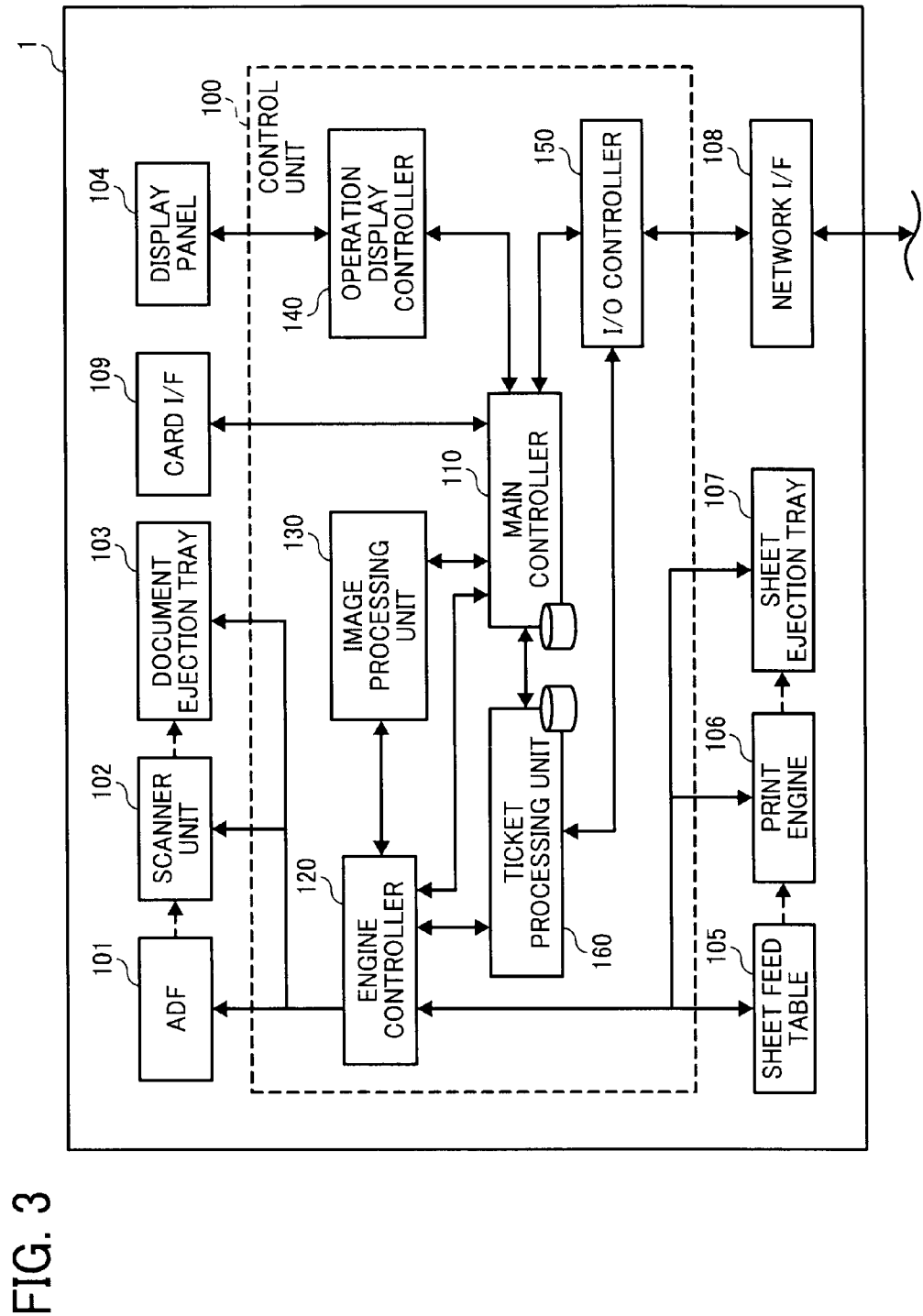
FIG. 3 is a functional block diagram of an information processing apparatus used in the verification system of FIG. 1A.

A description is now given to a functional configuration of the image processing apparatus 1 with reference to FIG. 3, which shows an example block diagram of a functional configuration of the image processing apparatus 1. FIG. 3 shows an example functional configuration of the image processing apparatus 1. As shown in FIG. 3, the image processing apparatus 1 may include, for example, a control unit 100, an automatic document feeder (ADF) 101, a scanner unit 102, a document ejection tray 103, a display panel 104, a sheet feed table 105, a print engine 106, a sheet ejection tray 107, a network interface (I/F) 108, and an card interface (I/F) 109.

Further, the control unit 100 may include, for example, a main controller 110, an engine controller 120, an image processing unit 130, an operation display controller 140, an input/output (I/O) controller 150, and a ticket processing unit 160. As shown in FIG. 3, the image processing apparatus 1 may be configured as a multi-functional apparatus including the scanner unit 102 and the print engine 106, which may be known as the multi-functional peripherals (MFP). Further, the electrical connections are shown by a solid-line arrow, and the flow of recording sheet or document sheet is shown by a dotted-line arrow in FIG. 3.

The card I/F 109 may be a card reader or card reading unit to read information stored in the IC card, in which the card I/F 109 may include a contact or non-contact type card readers depending on reading methods of cards.

The display panel 104 can be used as an output interface, which displays status of the image processing apparatus 1 as visual information, and also used as an input interface (or operation unit) to input information to the image processing apparatus 1 with an operation by a user. The display panel 104 may be devised as the LCD 60 and the operation unit 70 as shown in FIG. 2, and may be devised as a touch panel, for example, but not limited thereto. In an example embodiment, the user can operate the display panel 104 to instruct the registration of IC card, the card switching for re-issued IC card, or the like.

The network I/F 108 is used as an interface for the image processing apparatus 1 when the image processing apparatus 1 communicates with other apparatus or devices such as the client terminal 2, the server 3, or the like via a network, and the network I/F 108 may be, for example, Ethernet (registered trademark), universal serial bus (USB) interface, or the like but not limited thereto. The network I/F 108 may be used as the I/F 50 shown in FIG. 2. Further, the network I/F 108 may include a function of facsimile modem and function as an interface for facsimile transmission/reception when the image processing apparatus 1 conducts a facsimile transmission/reception via a network such as telephone lines.

The control unit 100 may be configured with a combination of software and hardware. Specifically, programs stored in a non-volatile memory such as ROM 30, HDD 40, and/or optical disk may be loaded to a volatile memory (hereinafter, memory) such as RAM 20, and the CPU 10 conducts processing using such programs, by which software-executing controller can be configured, and with a combination of software-executing controller and hardware such as an integrated circuit, the control unit 100 may be configured. The control unit 100 may function as a control unit to control the image processing apparatus 1 as a whole. The control unit 100 can be configured with various types of processor, circuit, or the like such as a programmed processor, a circuit, an application specific integrated circuit (ASIC), used singly or in combination.

Figure 1B:
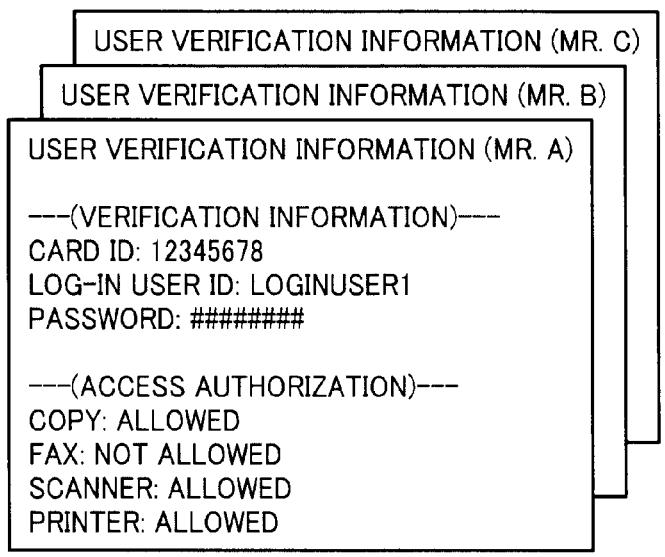
FIG. 1B shows user verification information including verification information and access authorization information used for the verification system of FIG. 1A.

The main controller 110 controls each unit in the control unit 100 by transmitting instructions to the each unit. Further, the main controller 110 can read information stored in the IC card by using the card I/F 109. Further, the main controller 110 verifies the access authorization of user based on information read from the IC card. To do so, the main controller 110 stores the user verification information, which relates the card identification (ID) information to identify each IC card and information for access authorization of apparatus for users. Example of user verification information is shown in FIG. 1A next to the image forming apparatus 1, and as shown FIG. 1B, the user verification information includes, for example, verification information and access authorization information. The verification information includes information for card identification (ID), log-in user identification (ID), and password used by a specific user. The access authorization information includes information indicating which functions are allowed to use by a specific user. Such user verification information is prepared for each IC card, and the each IC card is registered to the main controller 110 with the corresponding user verification information, and the user verification information can be used to determine whether one IC card is an authentic card for the apparatus. The user verification information includes the card ID information assigned for each card, which is verified and registered to a system or apparatus as the verified ID information for card. The main controller 110 can be configured with various types of processor, circuit, or the like such as a programmed processor, a circuit, an application specific integrated circuit (ASIC), used singly or in combination.

The engine controller 120 can be used as a driver to control and drive the print engine 106, the scanner unit 102, or the like. The image processing unit 130 generates drawing-image information based on to-be-output image data under the control of the main controller 110. The drawing-image information is information used for image drawing when an image forming operation is conducted by the print engine 106 used as an image forming unit.

Further, the image processing unit 130 processes data captured and input by the scanner unit 102 to generate image data. Such image data may be stored in a storage area of the image processing apparatus 1 as data obtained by a scanning operation, and can be transmitted to an external apparatus via the network I/F 108.

The operation display controller 140 displays various types of information on the display panel 104, and reports the various information input from the display panel 104 to the main controller 110. The input/output controller 150 inputs information, which is input via the network I/F 108, to the main controller 110. Further, the main controller 110 controls the input/output controller 150 to access the client terminal 2, the server 3, and other devices via the network I/F 108 and network. The ticket processing unit 160 can be used to devise the above described ticket processing function.

Figure 4:
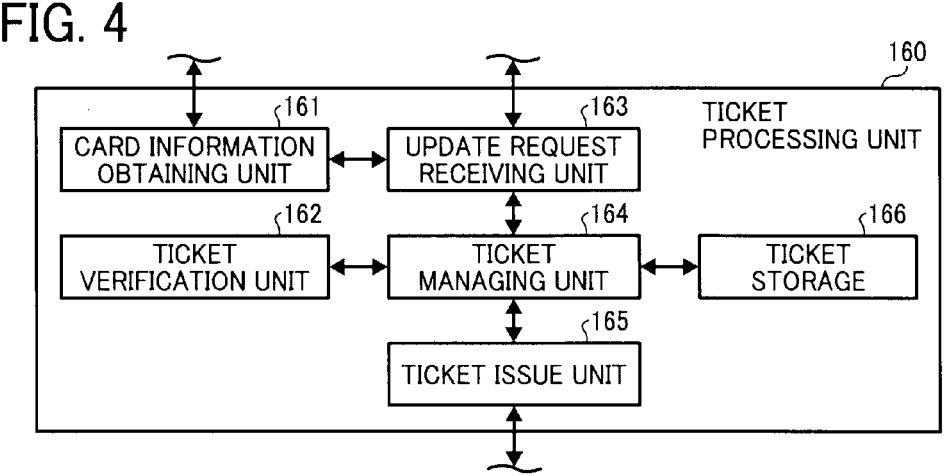
FIG. 4 shows a functional configuration of a ticket processing unit in the information processing apparatus used in the verification system of FIG. 1A.

A description is given of a functional configuration of the ticket processing unit 160 with reference to FIG. 4. As shown in FIG. 4, the ticket processing unit 160 includes a card information obtaining unit 161, a ticket verification unit 162, an update request receiving unit 163, a ticket managing unit 164, a ticket issue unit 165, and a ticket storage 166. The card information obtaining unit 161 obtains information stored in the IC card, read by the main controller 110, via the card I/F 109.

The ticket verification unit 162 refers to the card-switch ticket, input to the ticket processing unit 160, and determines the authenticity of the input card-switch ticket in view of the processing by the ticket managing unit 164. The update request receiving unit 163 receives an updating request of card such as a newly issued IC card and a re-issued IC card. The ticket managing unit 164 manages overall processing of card-switch ticket information at the ticket processing unit 160.

Upon receiving the card updating request by the update request receiving unit 163, the ticket issue unit 165 conducts the issuing process of a card-switch ticket. When the ticket issue unit 165 conducts the issuing process of card-switch ticket, the ticket issue unit 165 generates a ticket for an issuer (i.e., issuer ticket) and a ticket for an issuee (i.e., issuee ticket). The issuer ticket is stored in the image forming apparatus 1, and the issuee ticket is stored at an issuee, which can be designated by a user. Among the card-switch tickets issued by the ticket issue unit 165, the ticket storage 166 stores the ticket that needs to be stored in the image forming apparatus 1 used as an issuer of ticket. With such a configuration, the ticket processing unit 160 may function as an issuer of a card-switch ticket.

When the image processing apparatus 1 is operated as a printer, the input/output controller 150 may receive a print job via the network I/F 108 at first. Then, the input/output controller 150 transfers the received print job to the main controller 110. When the main controller 110 receives the print job, the main controller 110 controls the image processing unit 130 to generate drawing-image information based on document information or image data included in the print job.

When the image processing unit 130 generates drawing-image information, the engine controller 120 controls the print engine 106 to conduct an image forming operation to a sheet, transported from the sheet feed table 105, based on the generated drawing-image information. Specific configuration of the print engine 106 may be, for example, an image forming mechanism using the inkjet method or an image forming mechanism using the electrophotography but not limited thereto. The sheet having received the image forming operation by using the print engine 106 may be ejected to the sheet ejection tray 107.

When the image processing apparatus 1 is operated as a scanner, the image processing apparatus 1 may be input with a scanning execution instruction by a user's operation on the display panel 104, or input from an external device via the network I/F 108. In response to the input of scanning execution instruction, the operation display controller 140 or the input/output controller 150 transfers a scanning execution signal to the main controller 110. The main controller 110 controls the engine controller 120 based on the received scanning execution signal.

The engine controller 120 drives the ADF 101 to transport a document sheet having an image to be scanned to the scanner unit 102. Further, the engine controller 120 drives the scanner unit 102 to capture or scan the image of document transported from the ADF 101. When the document sheet is not set on the ADF 101 but set directly in the scanner unit 102, the scanner unit 102 captures or scans image of document under the control of the engine controller 120. Accordingly, the scanner unit 102 can be operated as an image capturing unit or image scanning unit, and the engine controller 120 functions as a scan control unit.

When the scanner unit 102 conducts an image capturing operation, optically scanned document information can be captured by an image capturing device such as charge-coupled device (CCD), and the captured image data is generated based on the optically scanned document information. The engine controller 120 transfers the captured image data generated by the scanner unit 102 to the image processing unit 130. Under the control of the main controller 110, the image processing unit 130 generates image data based on the captured image data received from the engine controller 120.

The image data generated by the image processing unit 130 may be stored in a storage unit such as HDD 40 in the image processing apparatus 1. As such, the scanner unit 102, the engine controller 120, and the image processing unit 130 may be interlinked to function as an image input unit, and the main controller 110 may function as an image information obtaining unit. The image data generated by the image processing unit 130 may be stored in the HDD 40 or the like, or transmitted to an external apparatus via the input/output controller 150 and the network I/F 108 in response to an instruction such as for example a user's instruction.

Further, when the image processing apparatus 1 is operated as a copier, the image processing unit 130 generates drawing-image information based on the captured-image data received by the engine controller 120 from the scanner unit 102, or based on the image data generated by the image processing unit 130. As similar to the printing operation, the engine controller 120 drives the print engine 106 based on the drawing-image information. Further, if the drawing-image information and captured-image data use the same format, the captured-image data can be used as the drawing-image information as it is.

Further, as similar to the scanning operation, when the image processing apparatus 1 is operated as a facsimile machine, the image processing unit 130 generates image data. Then, the main controller 110 controls the input/output controller 150 to conduct a facsimile transmission. In the facsimile transmission, under the control of the main controller 110, the input/output controller 150 transmits the image data to a designated transmission destination by driving a facsimile modem function provided for the network I/F 108.

Figure 5:
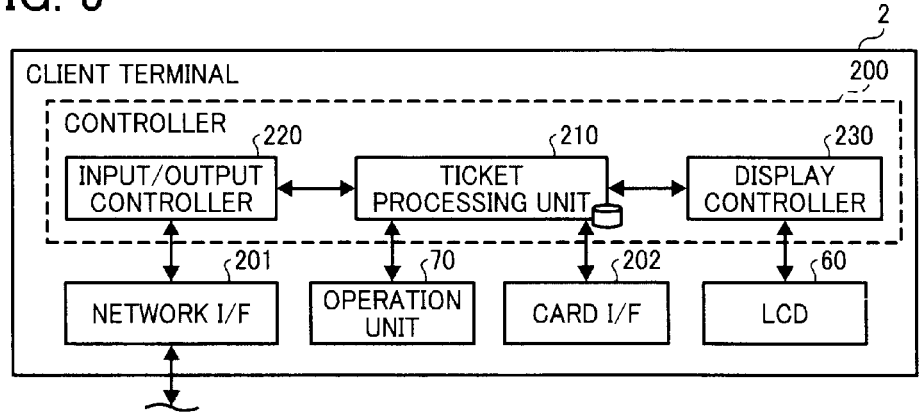
FIG. 5 shows a functional configuration of a client terminal used in the verification system of FIG. 1A.

A description is now given to a functional configuration of the client terminal 2 with reference to FIG. 5, which shows a block diagram or a functional configuration of the client terminal 2. As shown in FIG. 5, the client terminal 2 may include a controller 200, a network (interface) I/F 201, and a card (interface) I/F 202 with the LCD 60 and the operation unit 70 shown in FIG. 2. Further, the controller 200 may include a ticket processing unit 210, an input/output controller 220, and a display controller 230.

As similar to the image processing apparatus 1, the network I/F 201 is used as an interface when the client terminal 2 communicates with other apparatus such as the image forming apparatus 1 via a network. The network I/F 201 may be, for example, Ethernet (registered trademark), universal serial bus (USB) interface, or the like.

As similar to the image forming apparatus 1, the controller 200 may be configured by a combination of software and hardware. The controller 200 can be configured with various types of processor, circuit, or the like such as a programmed processor, a circuit, an application specific integrated circuit (ASIC), used singly or in combination. The client terminal 2 may be an apparatus, which is used as a destination to transmit the issued ticket such as card-switch ticket, wherein such client terminal 2 may be referred to as an issuee. The ticket processing unit 210 of the client terminal 2 processes information for the card-switch ticket.

Figure 6:
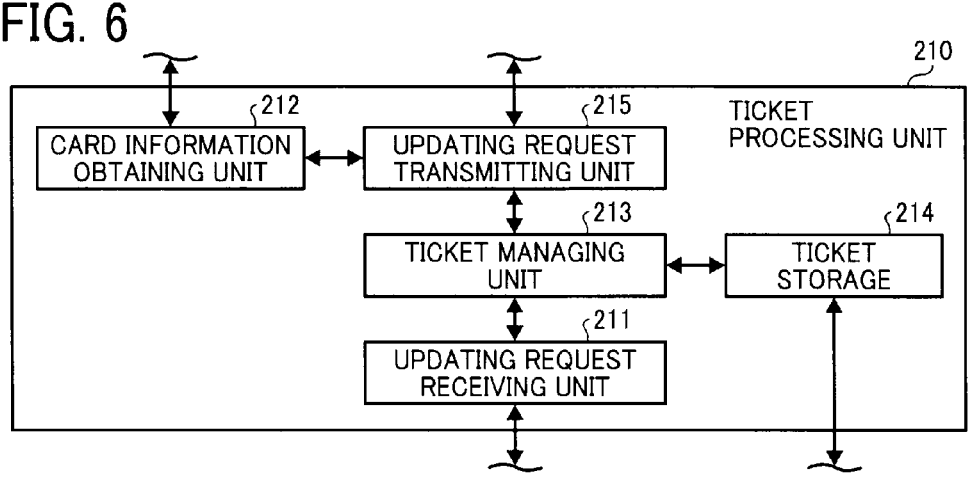
FIG. 6 shows a functional configuration of a ticket processing unit in the client terminal of FIG. 5.

A description is given of functional configuration of the ticket processing unit 210 with reference to FIG. 6. As shown in FIG. 6, the ticket processing unit 210 includes an updating request receiving unit 211, a card information obtaining unit 212, a ticket managing unit 213, a ticket storage 214, and an updating request transmitting unit 215.

The updating request receiving unit 211 receives a request of registering the access authorization of image forming apparatus 1 for a re-issued IC card in response to a user's operation, which may be conducted via the operation unit 70. When the request of registering the access authorization is received, the user may designate a destination (i.e., storage, memory) to store the card-switch ticket, and the updating request receiving unit 211 obtains the information for destination (i.e., storage, memory) for storing the card-switch ticket.

The card information obtaining unit 212 obtains information stored in the IC card via the card I/F 202. The ticket managing unit 213 manages an overall process of card-switch ticket information in the ticket processing unit 210. Further, the ticket managing unit 213 generates and outputs graphical user interfaces (GUIs) displayable on a screen and used as a user interface.

When the ticket issue unit 165 of the ticket processing unit 160 in the image forming apparatus 1 issues a card-switch ticket, and the client terminal 2 is designated as an issuee of ticket, the ticket storage 214 stores the issued card-switch ticket.

When the updating request receiving unit 211 receives a request of registering the access authorization of image forming apparatus 1, the updating request transmitting unit 215 transmits a card updating request to the image forming apparatus 1, wherein the card updating request includes information for the card-switch ticket, read out from the designated storage or memory in the client terminal 2 storing the card-switch ticket, and information read from the re-issued IC card, which is obtained by the card information obtaining unit 212.

The input/output controller 220 receives information via the network I/F 201, and inputs the information to the ticket processing unit 210, in which the network I/F 201 is used as an interface for receiving information from other devices, apparatuses, or the like. Further, the ticket processing unit 210 controls the input/output controller 220 to access other apparatuses such as the image forming apparatus 1 via the network I/F 201 and a network. The display controller 230 displays graphical user interfaces (GUIs) for the ticket processing unit 210 on the LCD 60 based on a screen condition output by the ticket processing unit 210.

In such verification system using the image forming apparatus 1 and the client terminal 2, an updating process of access authorization for the IC card is conducted when a card-switch ticket is issued for the image forming apparatus 1 and an IC card is re-issued using the image forming apparatus 1 or the client terminal 2.

Figure 7:
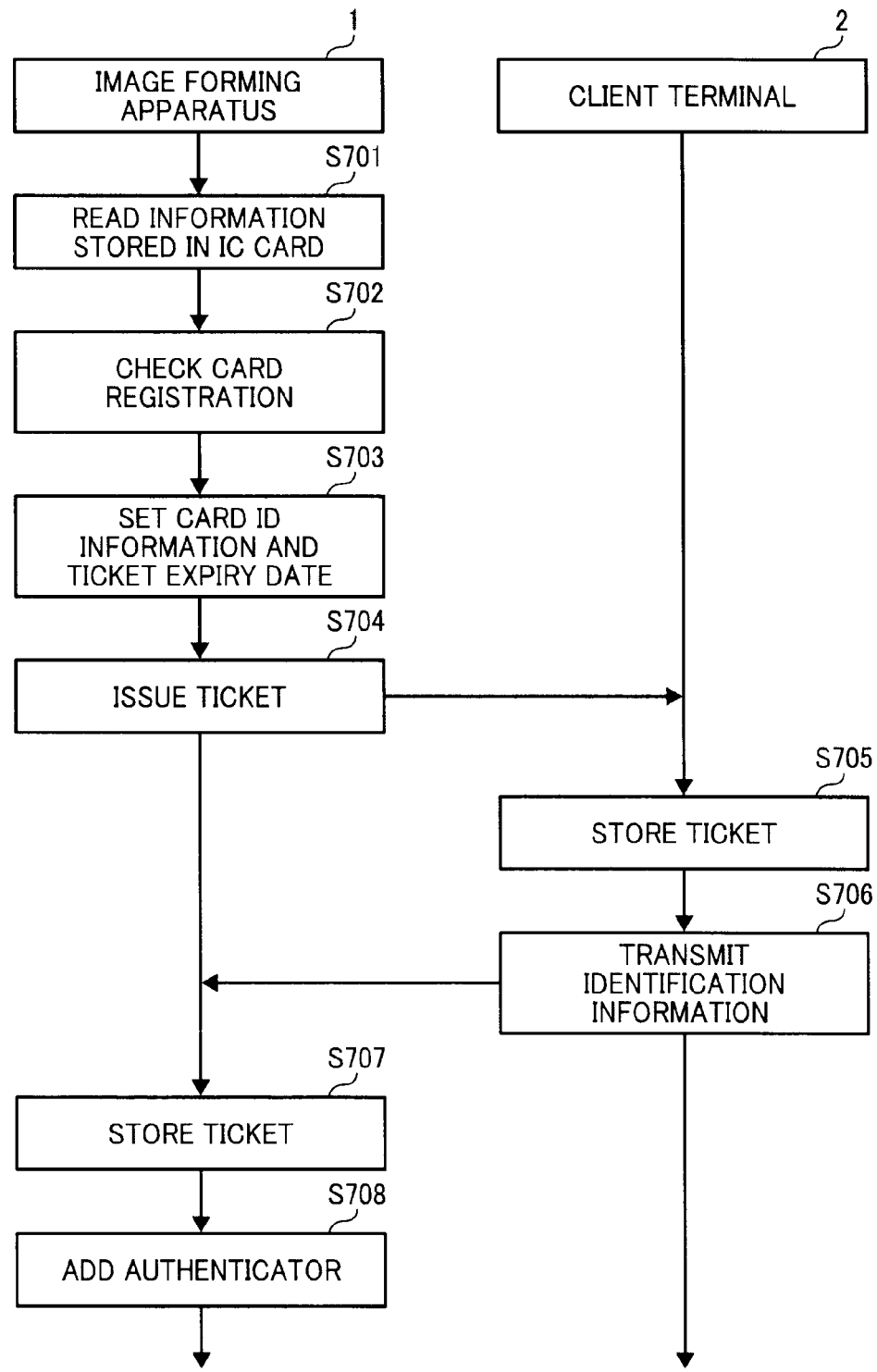
FIG. 7 is a flow chart of a registration process for an integrated circuit (IC) card according to an example embodiment.

A description is given of an operation of verification system of card according to an example embodiment with reference to FIG. 7.

FIG. 7 shows a flow chart of process of the verification system according to an example embodiment, in which a card-switch ticket is issued for a newly issued IC card. As shown in FIG. 7, at first, an IC card is read via the card I/F 109 of the image forming apparatus 1 when a user places the IC card on or over the card I/F 109, in which the main controller 110 reads information stored in the IC card (step S701). The information stored in the IC card is identification information to identify each IC card. As such, the IC card stores its individual identification (ID) information. The ID information for IC card may be a serial number, globally unique identifier (GUID) or unique identifier (UID) assigned to each of cards, which are unique to each other, but not limited thereto.

Upon obtaining the card ID information via the card I/F 109, the main controller 110 checks whether the concerned IC card is a registered card by referring the above described user verification information (step S702), in which the main controller 110 checks whether the read card ID information is already stored in the user verification information. When it is determined that the read card ID information is not yet registered at step S702, the following steps is conducted. Because the following steps relates to a process of granting a new access authorization of the image forming apparatus 1 for an IC card, it is preferable to include an approval process by an administrator and/or authenticator of the image forming apparatus 1.

When the access authorization of apparatus is to be granted or assigned to a new IC card, the main controller 110 reports the card ID information, read at step S701, to the ticket processing unit 160, by which the card information obtaining unit 161 obtains the card ID information, and the update request receiving unit 163 receives a request of issuing a card-switch ticket. Further, when to assign the access authorization of the apparatus to the new IC card, the card ID information obtained by the card information obtaining unit 161 is registered or stored as one piece of information in the user verification information stored in the main controller 110, in which the administrator or authenticator may conduct an operation of access authorization of apparatus to the new IC card.

When a request of issuing a card-switch ticket is generated, the ticket managing unit 164 sets the card ID information, input at step 701, and an expiry date of to-be-issued ticket to the ticket issue unit 165 (step S703), in which the ticket managing unit 164 functions as a ticket generator, and temporarily stores the card ID information and the expiry date at the ticket issue unit 165. The expiry date of ticket can be set in various ways. For example, the expiry date is an effective time limit set for an IC card when the IC card is issued with the access authorization; the expiry date is a time period such as a given period of time starting from the current date to a specific date in the future such as one year period; and the expiry date is designated by the upper limit of updating times of access authorization of one IC card such as up to three-times updating of IC card, or the like.

Upon setting the card ID information and expiry date to the ticket issue unit 165, the ticket issue unit 165 adds identification (ID) information for the image forming apparatus 1, which is used as an issuer of the card-switch ticket, and transmits the card-switch ticket to an issuee of ticket (step S704), designated by, for example, a card user. As such, at step S704, the card ID information, expiry date, and ID information for issuer can be transmitted as the card-switch ticket. The designation of the issuee of ticket may be conducted by a user, for example, at step S701 or step S704 by using the display panel 104. In case of FIG. 7, the client terminal 2 is designated as the issuee of ticket.

The issuee of ticket (e.g., client terminal 2) can be designed various ways. For example, a file path or a network path for a storage for storing a ticket file can be used, or a mail address of client terminal 2 which receives a ticket file can be used, in which the ticket file is transmitted with the e-mail.

Figure 8:
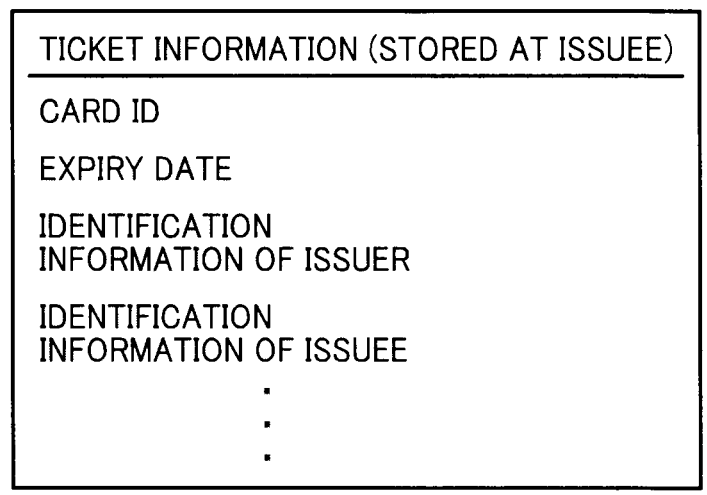
FIG. 8 shows an example of ticket information (stored at issuee) according to an example embodiment.

Upon receiving the card-switch ticket at the client terminal 2, the ticket managing unit 213 of the ticket processing unit 210 adds identification (ID) information for the client terminal 2, which is an issuee, to the received card-switch ticket, and then stores the received card-switch ticket added with the ID information for the issuee at the ticket storage 214 (step S705). As such, at step S705, the card ID information, expiry date, ID information designating the issuer and the ID information for issuee can be included as the card-switch ticket as shown in FIG. 8. The card-switch ticket shown in FIG. 8 includes information that is required for registering the IC card, and each piece of information included in the card-switch ticket is just simple information indicating use conditions set for the IC card. Accordingly, even if a third party person gets the card-switch ticket alone by accident or other reasons, the third party person can only recognize the generally use conditions of IC card, and cannot obtain any further information that is critical to access the concerned apparatus such as a log-in name, a password of the card user, or the like. Therefore, the security of user access for the concerned apparatus can be enhanced. Further, because the information for card-switch ticket is simply indicating the use conditions, the encryption of information can be omitted depending on the design of verification system, and thereby the verification system can be operated with the reduced processing and/or cost.

Upon storing the card-switch ticket at step S705, the client terminal 2 transmits the ID information for issuee (i.e., client terminal 2) to the image forming apparatus 1 used as the issuer of ticket (step S706). At the image forming apparatus 1, the ticket issue unit 165 obtains the ID information for issuee via the main controller 110. As such, the ticket issue unit 165 may function as an issuee information obtaining unit. Then, the ticket managing unit 164 stores the card ID information, expiry date and ID information for issuee as the ticket information (stored at issuer) at the ticket storage 166 (step S707). Further, if the user designates an authenticator having the authority to approve the setting or re-setting of access authorization of the image forming apparatus 1, the ticket managing unit 164 adds information for the authenticator to the card-switch ticket (step S708). With such a configuration, the ticket information shown in FIG. 9 can be stored at the ticket storage 166 as the ticket information (stored at issuer). The card-switch ticket shown in FIG. 9 includes information that is required for registering the IC card, and each piece of information included in the card-switch ticket is just simple information indicating use conditions set for the IC card. Therefore, the security of user access for the concerned apparatus can be enhanced. Further, because the information for card-switch ticket is simply indicating the use conditions, the encryption of information can be omitted depending on the design of verification system, and thereby the verification system can be operated with the reduced processing and/or cost.

The ID information for issuer (e.g., image forming apparatus 1) and the ID information for issuee (e.g., client terminal 2) shown in FIGS. 8 and 9 can be set as follows.

The ID information for issuer (e.g., image forming apparatus 1) may be, for example, a media access control (MAC) address, an internet protocol (IP) address, and a mail address of the image forming apparatus 1, or identification information such as specific characters and/or numbers assigned to the image forming apparatus 1, which may be globally unique identifier (GUID), but not limited thereto.

The ID information for issuee (e.g., client terminal 2) may be, for example, a media access control (MAC) address, an internet protocol (IP) address of client terminal 2, a mail address of user, or identification information such as specific characters and/or numbers specifically assigned to the client terminal 2. Further, the ID information for issuee may be a file path and/or network path including a folder name, and the specific number information assigned to user such as employee number, wherein the user receives the issued ticket, but not limited thereto.

Figure 9:
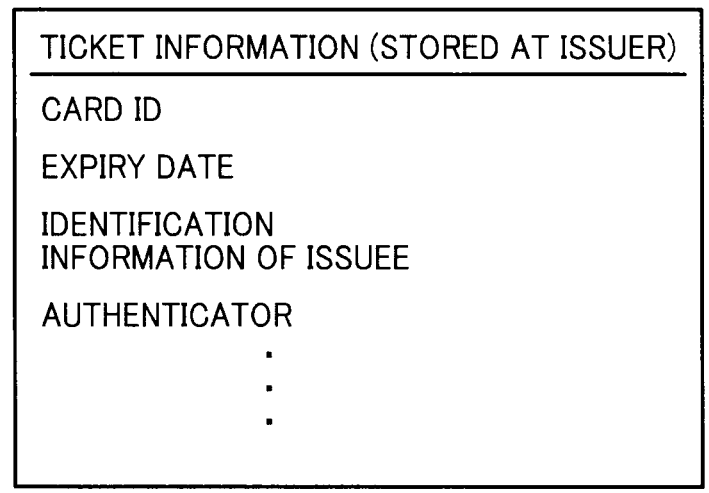
FIG. 9 shows an example of ticket information (stored at issuer) according to an example embodiment.

Further, the information for authenticator shown in FIG. 9 may designate one or more persons that can approve the access authorization of the image forming apparatus 1, and the information for authenticator may be a mail address or the like. The person that can approve the access authorization of the image forming apparatus 1 may be a user himself or herself, an administrator of the image forming apparatus 1, an authenticator designated separately from the administrator of the image forming apparatus 1, a person in a specific group, or the like. Further, as a verification function for registration of access authorization for a re-issued IC card, an identification number may be directly input.

With the above described configuration, when one IC card is lost or damaged, the IC card can be automatically switched to a new IC card. Specifically, the card-switch ticket that is used for switching of IC card, such as automatic switching of IC card, can be stored in a main apparatus used to verify access authorization to the main apparatus (e.g., image forming apparatus 1) of IC card, and the card-switch ticket can be stored in an issuee of ticket designated by a user, which is a target apparatus to be verified for access authorization of the main apparatus. When one IC card is to be re-issued, the user can conduct a card updating process for the re-issued IC card by using card-switch ticket stored at the issuee of ticket, and the re-issued IC card can be set with the access authorization of the main apparatus.

Figure 10:
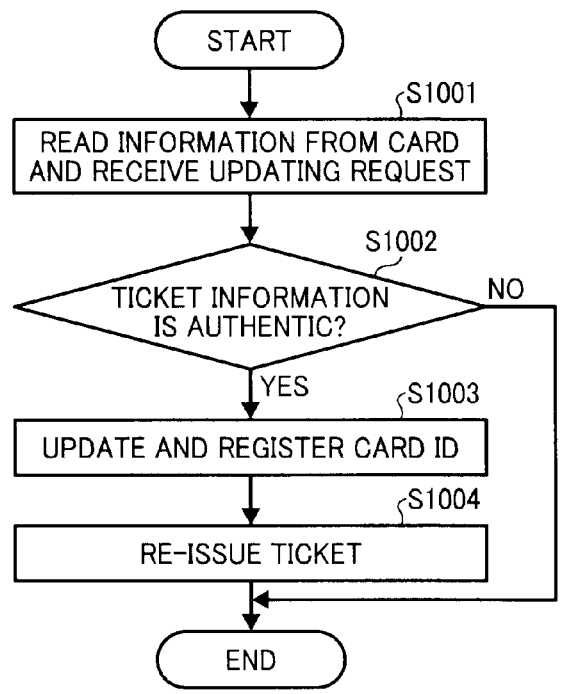
FIG. 10 is a flow chart of a re-registration process of a re-issued IC card according to an example embodiment.

A description is given of re-registration process for an IC card when the IC card is re-issued with reference to FIG. 10. In an example case shown in FIG. 10, a user operates the image forming apparatus 1 to conduct the re-registration process of IC card. At first, the main controller 110 reads information from a re-issued IC card via the card I/F 109, and receives a updating request from the operation display controller 140 in response to a user's operation on the display panel 104 (step S1001). As such, the main controller 110 may be used as an information reading unit or information reading processor.

When the updating request is generated at step S1001, the user operates the display panel 104 to designate an issuee for the card-switch ticket. Specifically, a storage of the ticket information (stored at issuee), shown in FIG. 8, is designated. In an example embodiment, a storage area of the ticket storage 214 of the client terminal 2 can be designated as the storage of the ticket information (stored at issuee). With such a configuration, the main controller 110 of the image forming apparatus 1 can obtain the ticket information (stored at issuee) from the ticket storage 214 of the client terminal 2 via a network.

Upon completing step S1001, the main controller 110 instructs the ticket processing unit 160 to determine whether the obtained card ticket is an authentic one (step S1002). At step S1002, the ticket processing unit 160 reads and refers the ticket information (stored at issuer) stored in the ticket storage 166 to determine the authenticity of the obtained card ticket. Such authenticity determination process will be described later in detail. If it is determined that the obtained card ticket is the authentic one (step S1002: Yes), the main controller 110 searches and retrieves the card ID information, included in the obtained card ticket information, from the user verification information stored in the main controller 110, and updates the card ID information included in the user verification information with the card ID information read at step S1001 (step S1003), which may be new card ID information for re-issued ID card. As such, the main controller 110 may be used as a verified identification (ID) information updating unit. With such processing, the access authorization of the image forming apparatus 1 for the re-issued IC card can be registered.

Further, the ticket processing unit 160 deletes the ticket information (stored at issuer) referred at step S1002, and re-issues a card-switch ticket based on the card ID information that is newly registered (step S1004). In step S1003, the processes from step S703 and subsequent steps shown in FIG. 7 are conducted. With such a configuration, when an IC card is lost or damaged, a re-issued IC card can be automatically registered as similar to a registration of a new IC card.

Figure 11:
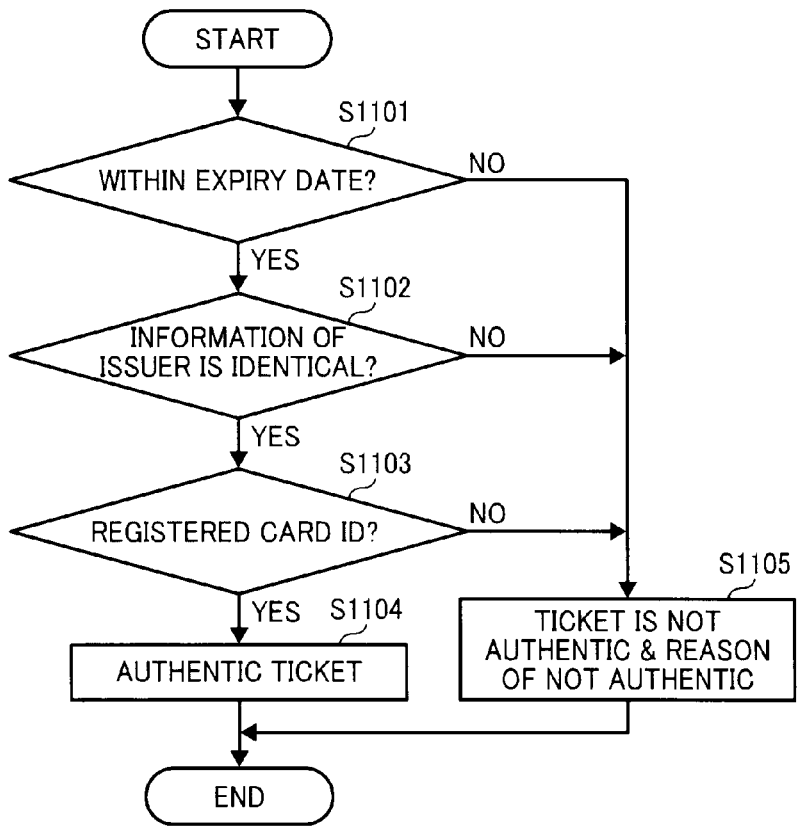
FIG. 11 is a flow chart of an authenticity check of ticket information (stored at issuee) according to an example embodiment.

A description is given of authenticity determination process of ticket at step S1002 with reference to FIG. 11. When the update request receiving unit 163 of the ticket processing unit 160 obtains the ticket information (stored at issuee) from the main controller 110, the ticket managing unit 164 inputs such information to the ticket verification unit 162 and requests an authenticity verification of the ticket information to the ticket verification unit 162. When the authenticity verification of the ticket information is requested, the ticket verification unit 162 determines the expiry date information included in the ticket information (stored at issuee) at step S1101.

If the current date is within the expiry date (step S1101: Yes), the ticket verification unit 162 determines the status of the ID information for issuer included in the ticket information (stored at issuee) at step S1102.

If the result at step S1102 indicates that the ID information for issuer is matched or identical to the ID information for the image forming apparatus 1 (step S1102: Yes), the ticket verification unit 162 determines whether the card ID information in the ticket information (stored at issuee) is already registered in the image forming apparatus 1 at step S1103. At step S1103, the ticket verification unit 162 refers to the user verification information managed by the main controller 110, and refers to the ticket information (stored at issuer) stored in the ticket storage 166.

If it is determined that the card ID information in the ticket information (stored at issuee) is already registered in the image forming apparatus 1 (step S1103: Yes), the ticket verification unit 162 determines the ticket information (stored at issuee) is the authentic one at step S1104, and then the process ends.

In contrast, if the current date exceeds the expiry date (step S1101: No), if the issuer is not matched or identical (step S1102: No), or if the card ID information is not registered in the image forming apparatus 1 (step S1103: No), the ticket verification unit 162 determines the ticket information (stored at issuee) is not the authentic one and outputs the reason of not authentic at step S1105, and then the process ends. The main controller 110 controls the operation display controller 140 to display the reason of not authentic on the display panel 104. With such processing, the authenticity determination process of ticket information (stored at issuee) can be completed.

Figure 12:
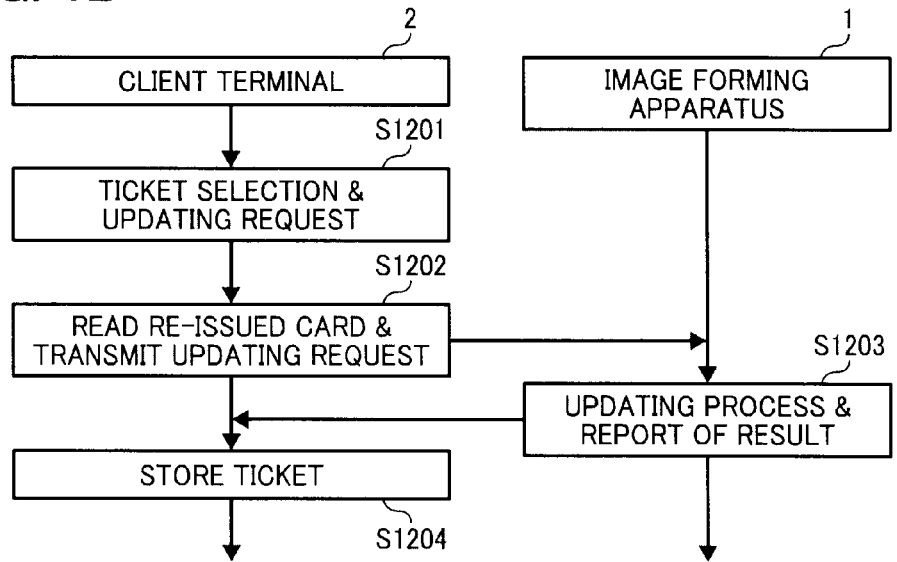
FIG. 12 is a flow chart of another re-registration process of a re-issued IC card according to an example embodiment.

A description is given of a re-registration process for a re-issued IC card with reference to FIG. 12, in which the re-registration is requested, for example, from the client terminal 2. As shown in FIG. 12, when a user operates the operation unit 70 of the client terminal 2 to input information to a graphical user interface (GUI) prepared for the ticket processing unit 210, the updating request receiving unit 211 obtains a storing area of the card-switch ticket issued for the IC card, and the updating request receiving unit 211 receives an updating request of the IC card at step S1201. The card-switch ticket issued for the concerned IC card is the ticket which has been stored in the storing area prior to the re-issuance of the IC card. With such process, the ticket managing unit 213 obtains the ticket information (stored at issuee) stored in the ticket storage 214.

Figure 13:
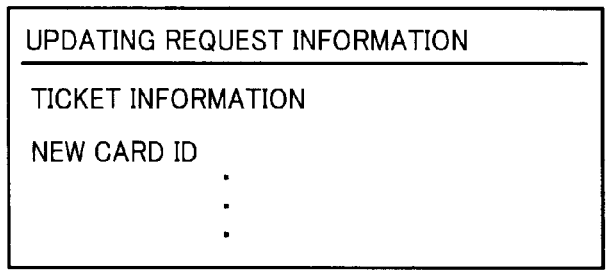
FIG. 13 shows an example of updating request information according to an example embodiment.

Further, when the user places the re-issued IC card on or over the card I/F 202, the card information obtaining unit 212 reads information stored in the re-issued IC card via the card I/F 202, and the updating request transmitting unit 215 of the client terminal 2 transmits a updating request to the image forming apparatus 1 at step S1202. FIG. 13 shows an example information set in the updating request, transmitted at step S1202. As shown in FIG. 13, the information included in the updating request, transmitted at step S1202, may be the ticket information (stored at issuee) obtained by designating the storing area at step S1201, and the card ID information for the re-issued IC card (i.e., new card ID information) read at step S1202.

In the image forming apparatus 1, the update request receiving unit 163 of the ticket processing unit 160 receives the updating request transmitted from the client terminal 2, and the updating process is conducted under the control of the ticket managing unit 164, and then the processed result is reported to the client terminal 2 at step S1203. At step S1203, the processes shown in FIG. 10 are conducted. Because the card ID information for the re-issued IC card is reported with the updating request as one transmission information at S1202, when step S1203 is conducted, only the receiving of updating request is conducted in appearance. With such processes, the access authorization of the image forming apparatus 1 can be registered for the re-issued IC card.

Further, upon successfully completing the updating process at step S1203 in the image forming apparatus 1, the result of the updating process at step S1203 is reported from the image forming apparatus 1 to the client terminal 2, in which the result information includes the ticket information (stored at issuee), which can be re-issued by conducting the process at step S1004.

With conducting such processes, in the client terminal 2, the ticket storage 214 obtains the ticket information (stored at issuee) transmitted from the image forming apparatus 1 and stores the ticket information (stored at issuee) at step S1204, and the ticket information, which is the old ticket information read at step S1201, may be deleted. With conducting such processes, the re-registration of access authorization for the re-issued IC card in response to a user's operation at the client terminal 2 can be completed.

In the verification system according to an example embodiment, the IC card used for the entry/exit administration of office buildings or the like is also used for verifying the access authorization of apparatus such as the image forming apparatus 1. In such verification system, when the IC card is lost or damaged, the card issuing administrator re-issues a new IC card, and then the verification of re-issued IC card can be conducted using the card-switch ticket generated in advance so that the access authorization of apparatus can be registered for the re-issued IC card.

With such a configuration, the security of the access authorization of the image forming apparatus 1 can be secured, and information communication between the card issuing administrator and the administrator of access authorization of apparatus can be omitted, by which the administrators' workload when the IC card is re-issued can be reduced, and the user can promptly use the apparatus by using the re-issued IC card.

Figure 14:
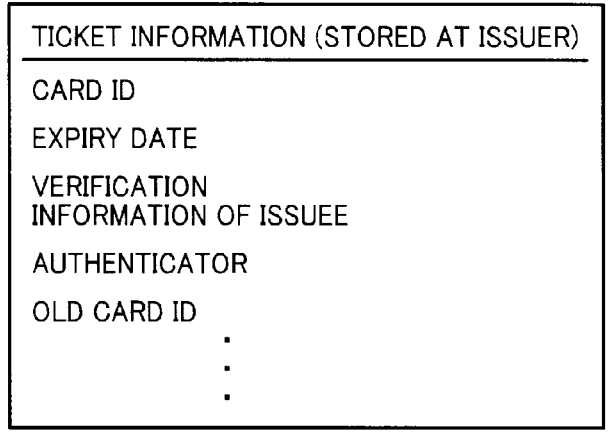
FIG. 14 shows an example of re-issued ticket information (stored at issuer) according to an example embodiment.

With reference to FIG. 14, a description is given of information include-able in the ticket information (stored at issuer) stored in the ticket storage 166 of the ticket processing unit 160 of the image forming apparatus 1 when step S1004 (FIG. 10) is conducted.

As shown in FIG. 14, the ticket information (stored at issuer) after completing the updating process includes information such as the card ID information, expiry date, ID information for issuee, and authenticator as similar to the ticket information (stored at issuer) shown in FIG. 9, wherein the card ID information shown in FIG. 14 is the card ID information for the re-issued IC card read at step S1001 of FIG. 10, which is the new card ID information.

Further, as shown in FIG. 14, the ticket information (stored at issuer) after completing the updating process may include the old card ID information. The old card ID information is the card ID information prior to re-issuance of the IC card. By storing the old card ID information when the IC card is re-issued, the old IC card ID information and the new IC card ID information can be correlated, and the information for re-issue history of IC card can be confirmed or checked.

In the above described example embodiment, the ticket storage 214, which may be the HDD 40 of the client terminal 2, is used as the issuee of card-switch ticket. But the issuee of card-switch ticket is not limited thereto. For example, the server 3 shown in FIG. 1A can be designated as the issuee of card-switch ticket, in which the server 3 can be configured using the configuration shown in FIG. 6 having the ticket processing unit 210, by which the server 3 having the similar effect of the above described client terminal 2 can be devised. As such, the server 3 can be used as a ticket server to store the ticket information, and the server 3, which may be designed to be more robust than the client terminal 2, can be used as an apparatus to store the ticket information with a secured manner compared to the client terminal 2.

In the above described example embodiment, the ticket processing unit 210 in the client terminal 2 or the server 3 receives the card-switch ticket from the image forming apparatus 1. Then, the ticket processing unit 210 adds the ID information for issuee, that is the ID information for the client terminal 2 or the server 3 itself, to the card-switch ticket, and store such ticket information (stored at issuee). In such configuration, two applications are required to be operated when a ticket is issued, wherein one application may be the ticket processing unit 160 in the image forming apparatus 1, and another application may be the ticket processing unit 210 in the apparatus designated as the issuee. Therefore, the security of information when issuing the ticket can be enhanced.

Figure 15:
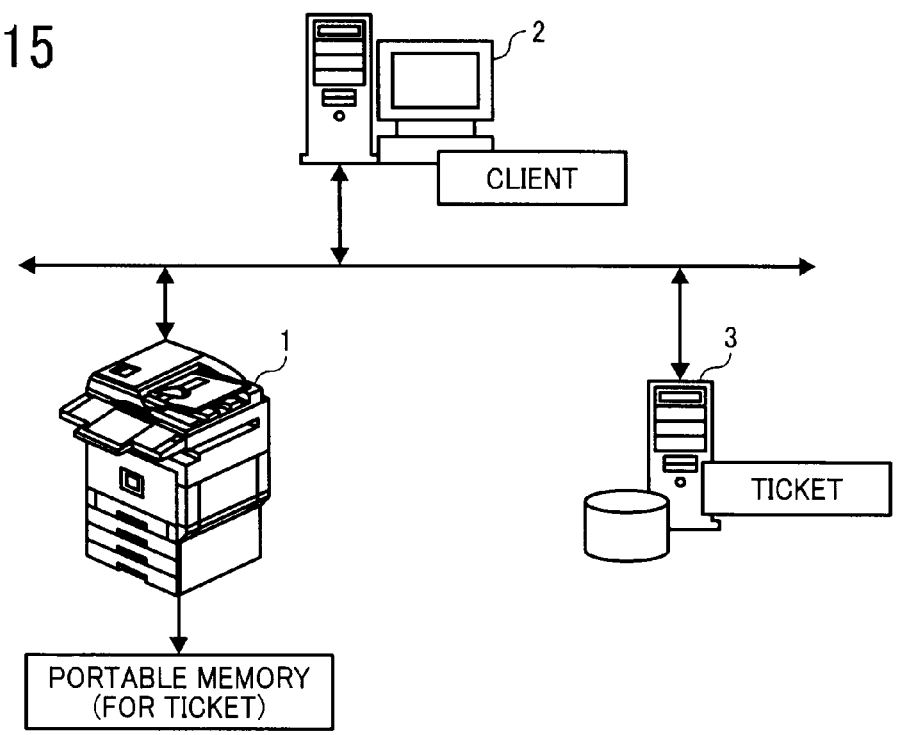
FIG. 15 shows an operating environment of verification system according to another example embodiment.
Figure 16:
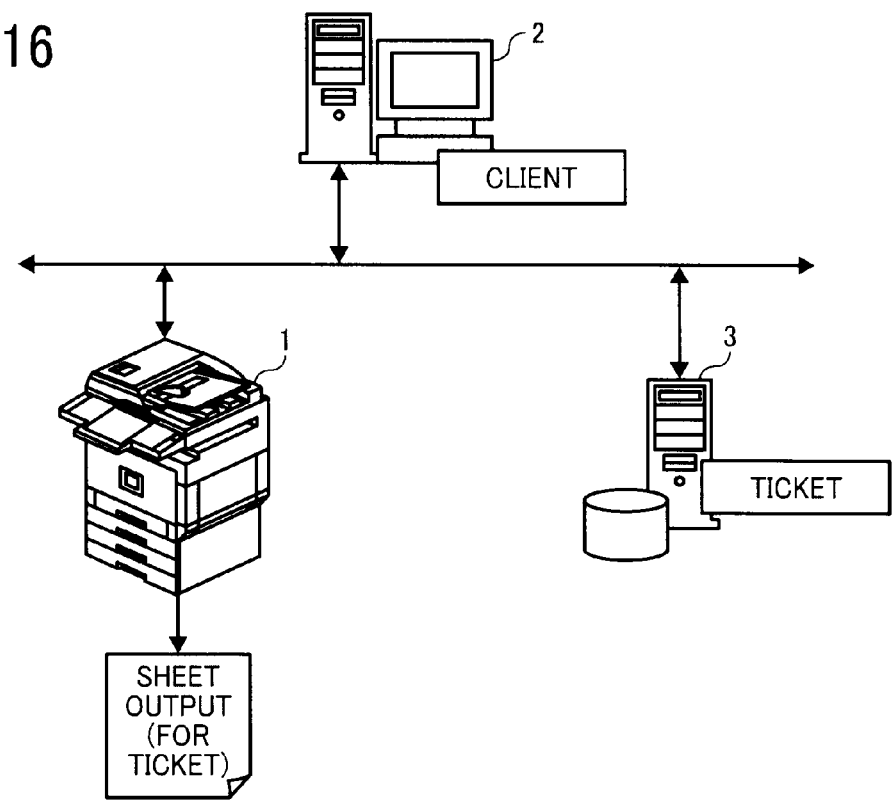
FIG. 16 shows an operating environment of verification system according to still another example embodiment.

Further, another configuration can be set for the issuee of ticket, in which an application such as the ticket processing unit 210 may not be required when issuing the ticket. A description is given of another configuration with reference to FIGS. 15 and 16. FIG. 15 shows a configuration designating a removable storage medium or removable memory such as a universal serial bus (USB) memory, a secure digital (SD) memory card or the like as the issuee of card-switch ticket. FIG. 16 shows a configuration designating a sheet such as paper as the issuee of card-switch ticket.

In a case of FIG. 15, the removable storage medium or removable memory may be connected to the image forming apparatus 1 by a user, and then the removable storage medium or removable memory is designated as the issuee of card-switch ticket. In such a configuration, the ticket issue unit 165 can issue a ticket at a storage area of the designated removable storage medium or removable memory.

In a case of FIG. 16, a user designates a print output such as sheet as the issuee of card-switch ticket. In such a configuration, the ticket issue unit 165 generates a print job using an image data corresponding to the generated card-switch ticket, and the image forming apparatus 1 conducts a printing of card-switch ticket information (i.e., print-out of ticket information).

In cases shown in FIGS. 15 and 16, the issuee of ticket is a simple recording medium such as a memory or a sheet. Therefore, different from the above described client terminal 2 or the server 3, an application such as the ticket processing unit 210 is not operated in the configurations shown in FIGS. 15 and 16. Therefore, the removable storage medium or sheet used as the issuee of ticket cannot transmit the ID information for issuee to the information processing apparatus, which is described at step S706 of FIG. 7.

Accordingly, when such a simple recording medium, which cannot operate an application to transmit the issuee of ticket, is designated as the issuee of ticket, the ticket managing unit 164 generates and sets the ID information for issuee at the ticket issue unit 165. In such a configuration, the ticket issue unit 165 can issue a card-switch ticket including the ID information for issuee. Accordingly, even when the simple recording medium is designated as the issuee of ticket, ticket information (stored at issuee) can be issued, as similar to the information shown in FIG. 8.

In the configuration using the removable storage medium as the issuee of card-switch ticket, when the card-switch ticket is issued to the removable storage medium and an IC card is to be re-issued, a user connects the removable storage medium to the image forming apparatus 1 or client terminal 2. In such process, the user can designate the removable storage medium as the storage to store a ticket, and requests a re-registration of access authorization for the re-issued IC card using the ticket information stored in the removable storage medium. With such a configuration, the process can be conducted as similar to the above described example embodiment.

Further, in the configuration using the sheet (e.g., paper) as the issuee of card-switch ticket, when the card-switch ticket is issued to the sheet and an IC card is to be re-issued, a user can operate the display panel 104 of the image forming apparatus 1 or the operation unit 70 of the client terminal 2 to manually input each piece of information included in the ticket information (stored at issuee) shown in FIG. 8 to input the card-switch ticket information to the verification system, and then the user requests the re-registration of access authorization for the re-issued IC card using the input ticket information. With such a configuration, the process can be conducted as similar to the above described example embodiment.

Further, when the sheet (e.g., paper) is used as the issuee of card-switch ticket, and the re-registration of access authorization of IC card is conducted using the image forming apparatus 1 by using the process shown in FIG. 10, the image forming apparatus 1 can use its scanning function. Specifically, if the image forming apparatus 1 includes a scanning function such as an optical character recognition (OCR) function, the sheet (e.g., paper) can be scanned by the OCR, with which each piece of information included in the ticket information (stored at issuee) shown in FIG. 8 can be input to the verification system.

Further, when the sheet (e.g., paper) is used as the issuee of card-switch ticket, each piece of information included in the ticket information (stored at issuee) can be output as an image composed of text information, or an image composed of coded information by encoding each piece of information included in the ticket information using given coding methods such as the bar code method.

When the ticket information (stored at issuee) is encoded as the coded information, the image forming apparatus 1 needs a decoding function which can decode such encoded information to input the ticket information to the verification system, in which the decoding function may be included in the scanning function of the image forming apparatus 1. In such a configuration, the ticket information not visible or not recognizable to human eyes (invisible or non-recognizable information for human eyes) can be used, and thereby the information security can be enhanced, and the ticket information can be input to the image forming apparatus 1 automatically.

Further, in the above described example embodiments, the ticket processing unit 160, disposed in the image forming apparatus 1, is used as the ticket issuer. However, the ticket processing unit 160 can be separated from the image forming apparatus 1, and disposed in a server independent from the image forming apparatus 1. In such a case, the image forming apparatus 1 may be used as an interface for users, and the independent server may conduct steps S703, S704, S707, and S708. As such, the image forming apparatus 1 and other information processing apparatus can be linked and used as an issuer of card-switch ticket collectively.

Further, in the above described example embodiment, the card ID information stored in the IC card may be a serial number assigned for each IC card, a number or sign assigned by the card issuing administrator, or the like. Further, in the above described example embodiment, information stored in the IC card, information stored in the ticket information (stored at issuee), and information stored in the ticket information (stored at issuer) can be preferably encoded and stored, in which the encoding/decoding of information can be conducted using known encoding/decoding methods.

In the above described example embodiments, IC cards carried by users can be used to verify the access authorization of apparatus by users, and when the IC cards is re-issued, information exchange between the card issuing administrator and the administrator of access authorization of apparatus can be omitted, by which the administrators' workload when the IC card is re-issued can be reduced, and the user can promptly use the apparatus by using the re-issued IC card.

Although the above example embodiment describes the verification process of access authorization for users of image forming apparatuses (e.g., copier), the disclosure of the present invention can be similarly applied to various types of information processing apparatuses, which need to be devised with the verification process for the access authorization of apparatuses, and the application fields of such information processing apparatuses is not limited to any specific field.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USE memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus employing user access authorization management that verifies user access authorization using a portable storage medium storing identification (ID) information for the portable storage medium and user verification information registered in the information processing apparatus while including a portable storage medium ID as verified ID information for the portable storage medium, the information processing apparatus comprising a processor configured to conduct the steps of:

reading the portable storage medium ID from the portable storage medium;

generating ticket information by including the portable storage medium ID read at the reading step and use condition information for the portable storage medium, the ticket information being prepared when updating the verified ID information for the portable storage medium registered in the information processing apparatus;

designating an issuee to be transmitted with the generated ticket information from the information processing apparatus;

transmitting the generated ticket information to the designated issuee;

receiving a request to update the verified ID information for the portable storage medium registered in the information processing apparatus;

obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus;

verifying authenticity of the ticket information obtained at the obtaining step by comparing contents included in the obtained ticket information and contents included in the user verification information registered in the information processing apparatus;

retrieving the portable storage medium ID, matched to the portable storage medium ID included in the obtained ticket information, from the user verification information registered in the information processing apparatus when the authenticity of the obtained ticket information is verified at the verification step; and updating the portable storage medium ID, included in the user verification information registered in the information processing apparatus, with the ID information for the new portable storage medium, wherein the obtaining step obtains information designating the issuee of the generated ticket information, wherein the issuee can be designated by user operation.

2. The information processing apparatus of claim 1, wherein the generating step generates the ticket information by including identification (ID) information for an issuer that issues the ticket information, the issuer of the ticket information being the information processing apparatus, and the verifying step verifies the authenticity of the ticket information based on the ID information for the issuer included in the obtained ticket information.

3. The information processing apparatus of claim 1, wherein when the portable storage medium ID included in the user verification information is updated with the ID information for the new portable storage medium, the generating step generates the ticket information by including the ID information for the new portable storage medium, and the transmitting steps transmits the generated ticket information to the designated issuee.

4. The information processing apparatus of claim 1, wherein the generating step generates the ticket information by including information designating an authenticator having authority to approve updating of the user verification information, and the updating step issues a request to update the user verification information including the portable storage medium ID to the designated authenticator included in the obtained ticket information.

5. The information processing apparatus of claim 1, wherein the generating step generates the ticket information including an effective time limit for the portable storage medium, and the verifying step verifies the authenticity of the generated ticket information based on the effective time limit for the portable storage medium.

6. The information processing apparatus of claim 1, wherein, when the portable storage medium ID included in the user verification information is updated with the ID information for the new portable storage medium, the generating step generates the ticket information including the ID information for the new portable storage medium, and wherein the information processing apparatus further comprising a ticket storage, and the processor is further configured to conduct the steps of storing the ticket information by including the ID information for the new portable storage medium, and the portable storage medium ID set in the user verification information until the updating is conducted, to the ticket storage.

7. The information processing apparatus of claim 6, wherein, upon obtaining identification (ID) information for the issuee identifying the designated issuee, the storing step stores the ticket information including the ID information for the issuee to the ticket storage.

8. The information processing apparatus of claim 7, wherein the obtaining step further obtains the ID information for the issuee from the issuee that is transmitted with the ticket information to from the information processing apparatus.

9. The information processing apparatus of claim 1, wherein, when the ID information for the new portable storage medium, read from the new portable storage medium, is registered as the portable storage medium ID in the user verification information, the generating step generates the ticket information for updating the user verification information.

10. The information processing apparatus of claim 1, wherein the information processing apparatus is an image forming apparatus.

11. The information processing apparatus of claim 1, wherein the portable storage medium is a non-volatile memory.

12. The method of claim 11, wherein the non-volatile memory is an integrated circuit (IC) card.

13. A user verification system, comprising:

the information processing apparatus of claim 1 used as a first information processing apparatus and an issuer of a ticket; and a second information processing apparatus, useable as the issuee with respect to the first information processing apparatus, the second information processing apparatus having a processor configured to conduct the steps of:

storing the ticket information transmitted from the first information processing apparatus by adding the identification (ID) information for the second information processing apparatus identifying the issuee; and transmitting the ID information for the second information processing apparatus to the first information processing apparatus as the ID information identifying the issuee upon receiving the ticket information from the first information processing apparatus.

14. The user verification system of claim 13, wherein the first information processing apparatus further comprising a first ticket storage to store ticket information generated for the first information processing apparatus, and the second information processing apparatus further comprising a second ticket storage to store ticket information generated for the second information processing apparatus.

15. The user verification system of claim 14, wherein the first ticket storage of the first information processing apparatus stores the ticket information including the portable storage medium ID, an effective time limit for the portable storage medium, the ID information for the issuee, and the second ticket storage of the second information processing apparatus stores the ticket information including the portable storage medium ID, the effective time limit for the portable storage medium, the ID information for the issuee, and ID information for the issuer.

16. A method of managing user access authorization for an information processing apparatus, the user access authorization of the information processing apparatus verifiable using a portable storage medium storing identification (ID) information for the portable storage medium and user verification information registered in the information processing apparatus while including a portable storage medium ID as verified ID information for the portable storage medium, the method comprising the steps of:
  reading the portable storage medium ID from the portable storage medium;
  generating ticket information by including the portable storage medium ID read at the reading step and use condition information for the portable storage medium, the ticket information being prepared when updating the verified ID information for the portable storage medium registered in the information processing apparatus;
  designating an issuee to be transmitted with the generated ticket information from the information processing apparatus;
  transmitting the generated ticket information to the designated issuee;
  receiving a request to update the verified ID information for the portable storage medium registered in the information processing apparatus;
  obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus;
  verifying authenticity of the ticket information obtained at the obtaining step by comparing contents included in the obtained ticket information and contents included in the user verification information registered in the information processing apparatus;
  retrieving the portable storage medium ID, matched to the portable storage medium ID included in the obtained ticket information, from the user verification information registered in the information processing apparatus when the authenticity of the obtained ticket information is verified at the verification step; and
  updating the portable storage medium ID, included in the user verification information registered in the information processing apparatus, with the ID information for the new portable storage medium,
  wherein the obtaining obtains information designating the issuee of the generated ticket information, wherein the issuee can be designated by user operation.

17. A non-transitory computer-readable medium storing a program comprising instructions that when executed by a computer cause the computer to execute a method of managing user access authorization for an information processing apparatus, the user access authorization of the information processing apparatus verifiable using a portable storage medium storing identification (ID) information for the portable storage medium and user verification information registered in the information processing apparatus while including a portable storage medium ID as verified ID information for the portable storage medium, the method comprising the steps of:
  reading the portable storage medium ID from the portable storage medium;
  generating ticket information by including the portable storage medium ID read at the reading step and use condition information for the portable storage medium, the ticket information being prepared when updating the verified ID information for the portable storage medium registered in the information processing apparatus;
  designating an issuee to be transmitted with the generated ticket information from the information processing apparatus;
  transmitting the generated ticket information to the designated issuee;
  receiving a request to update the verified ID information for the portable storage medium registered in the information processing apparatus;
  obtaining the generated ticket information and the ID information for a new portable storage medium when the portable storage medium is to be changed to the new portable storage medium when the request to update is received at the receiving step, the ID information for the new portable storage medium to be used to update the verified ID information for the portable storage medium registered in the information processing apparatus;
  verifying authenticity of the ticket information obtained at the obtaining step by comparing contents included in the obtained ticket information and contents included in the user verification information registered in the information processing apparatus;
  retrieving the portable storage medium ID, matched to the portable storage medium ID included in the obtained ticket information, from the user verification information registered in the information processing apparatus when the authenticity of the obtained ticket information is verified at the verification step; and
  updating the portable storage medium ID, included in the user verification information registered in the information processing apparatus, with the ID information for the new portable storage medium,
  wherein the obtaining obtains information designating the issuee of the generated ticket information, wherein the issuee can be designated by user operation.

* * * * *